United States Patent

Solomon

[15] 3,640,584
[45] Feb. 8, 1972

[54] SMALL VEHICLE WHEEL
[72] Inventor: Milton Solomon, Chicago, Ill.
[73] Assignee: Circle Engineering Co., Inc., Chicago, Ill.
[22] Filed: Aug. 12, 1969
[21] Appl. No.: 849,307

[52] U.S. Cl. ........................301/63 PW, 308/187.1, 308/210
[51] Int. Cl. .............................................................B60b 5/02
[58] Field of Search ................301/63; 308/187.1, 210, 207, 308/212

[56] References Cited

UNITED STATES PATENTS

| | | | |
|---|---|---|---|
| 2,486,270 | 10/1949 | Fawick | 308/187.1 |
| 2,743,971 | 5/1956 | Kramcsak | 308/187.1 |
| 2,917,328 | 12/1959 | Peterson | 308/187.1 X |
| 3,387,894 | 6/1968 | Louik | 301/63 |
| 3,404,926 | 10/1968 | Horne | 308/187.1 UX |

Primary Examiner—Richard J. Johnson
Attorney—Silverman & Cass

[57] ABSTRACT

A small integral molded vehicle wheel comprising a rim, a hub and connecting support structure. A roller bearing assembly comprising a split outer race, rollers and cage structure, is disposed within the hub and a resilient retaining end cap lockingly engages the hub bore retaining the rollers and cage in proper axial alignment. An integral seal is formed with the end cap so as to prevent the ingress of dirt and foreign material. A method for making the above-described wheel comprising the steps of: injection molding the rim, connecting support structure and hub; inserting a split outer race into the bore of the hub while the injection-molded piece is still hot; and cooling the structure so as to cause the inner diameter of the hub to contract and thereby to secure the split outer race in position in the hub.

16 Claims, 3 Drawing Figures

PATENTED FEB 8 1972 3,640,584
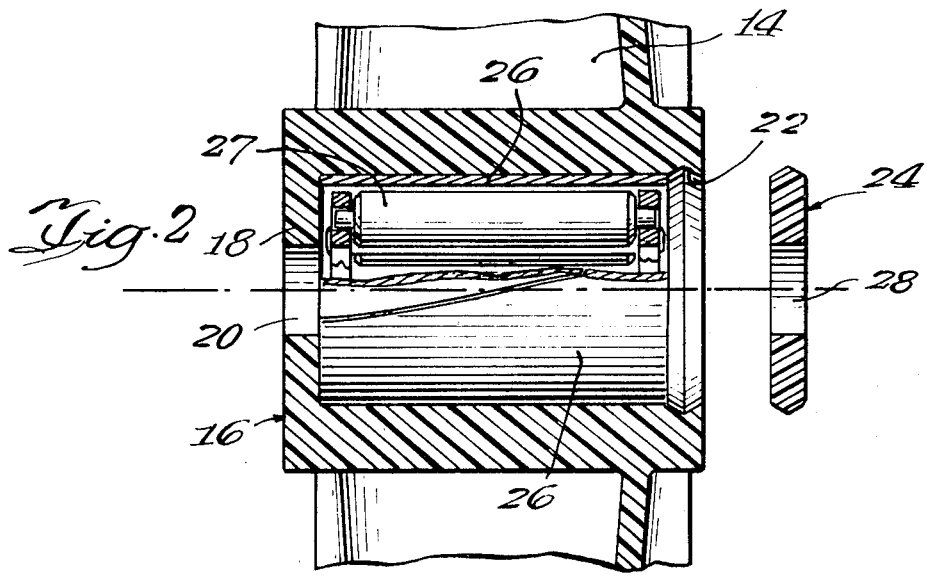
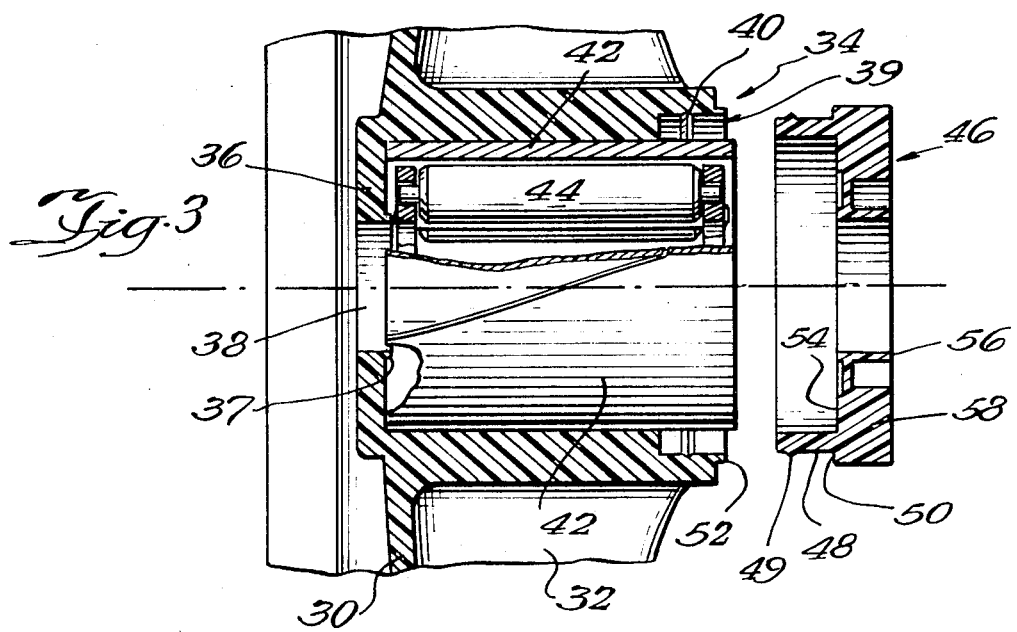
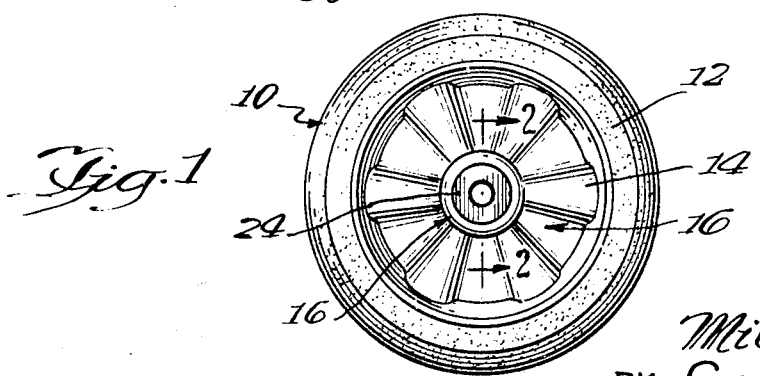
INVENTOR
Milton Solomon
BY Silverman & Cass
ATTORNEYS

SMALL VEHICLE WHEEL

RELATED APPLICATIONS

Copending U.S. Pat. application Ser. No. 789,154, filed Jan. 6, 1969, discloses the wheel structure which is used in a preferred embodiment of my invention.

BACKGROUND OF THE INVENTION

This invention relates to wheels for use on small vehicles, such as lawn mowers, carriages, and movable industrial equipment; more particularly being concerned with integral, injection-molded plastic wheels.

Small wheels of the general type with which this invention is concerned have been manufactured out of pressed steel, and more recently out of injection-molded plastics. The steel wheels have had more widespread use insofar as scope is concerned because of their greater strength, although the plastic wheel offers advantages of lightweight and economy. Thus, it has been accepted in the art that where a wheel load is expected to be several hundred pounds and more, steel wheels should be used. Thus, industrial use of plastic wheels has been greatly limited.

The desirability of antifriction means is recognized universally, but use of the same in small wheels has been limited, even in steel wheels. The simpler forms of journals are most commonly used, such as for example a bushing inserted into the wheel hub, the shaft engaging directly upon the inner surface of the bushing. Obviously, ball and roller bearing assemblies are much better than simple sleeve bearings, but cost substantially more, as well.

The use of roller or ball bearing assemblies in plastic wheels is not common, and so far as known, is believed to be limited to special purpose structures. Since a plastic wheel is believed incapable of supporting a heavy load, those skilled in the art would naturally not consider mounting ball or roller bearing assembly therein, aside from the great expense, and the complexity of mounting the assembly.

The invention teaches a structure utilizing a novel type of roller bearing assembly in combination with a plastic wheel, as will be detailed hereinafter. The use of a conventional roller bearing assembly in a plastic wheel gives rise to the difficult problem of sealing the lubricant into the bearing and keeping dirt and foreign particles out of the bearing. This is additional to the disadvantages of expense, complexity and the increase in the weight of the wheel.

Certain small wheel structures are known, but these fall short of the requirements which are met by the invention herein. Thus, the structure of U.S. Pat. No. 2,757,054 appears to teach a plastic roller having steel rollers as antifriction means, but these steel rollers engage against a hub surface which is plastic, and require a relatively complex shaft and mounting structure. The device is used in the guides of garage doors and hence has little or no load carried thereby. Any substantial load on a wheel constructed like these garage door rollers could cause distortion due to the rollers pressing into the nylon bearing surface. The more conventional caged roller bearing assembly is so expensive as to make its use prohibitive in a wheel of the type intended to be manufactured in extremely large quantities and sold for a price less than the usual cost of a conventional bearing assembly alone.

The invention is applicable to any type of plastic wheel, but has added advantages when used with a structure of the type disclosed in copending application, Ser. No. 789,154. This latter structure is an integral, injection-molded plastic wheel which is constructed in a novel manner so as to render the same capable of supporting much heavier loads than the known plastic wheels of the same size.

SUMMARY OF THE INVENTION

The invention is concerned with a small plastic vehicle wheel capable of carrying heavy loads, which comprises a rim, a hub and a connecting support structure, and a bearing assembly is disposed and retained within the hub. This bearing assembly includes a split outer race which engages the bore of the hub and roller or ball elements which may be retained within a cage, the elements roll upon the outer race and engage the axle on which the wheel is mounted. The sleeve, cage and rolling elements are held in axial alignment by at least one resilient end cap which lockingly engages the hub of the wheel. The locking engagement may be accomplished by an interference fit or by a groove in the hub which mates with the peripheral configuration of the end cap. Moreover, the resilient end cap can be provided with an axial wall which acts as a sealing member, and seals the axle and bearing assembly from the ingress of foreign matter. In another embodiment of the invention, a blind end retaining cap is integrally molded at one end of the hub and thus, only one retaining cap is needed since the blind end retains the other end of the bearing. If it is so desired, the blind end can be molded with an axial wall sealing member.

BRIEF DESCRIPTION OF THE DRAWINGS

FIG. 1 is a front elevational view of a wheel, which embodies the invention, having an undulated web, a hub, and a rim.

FIG. 2 is a partially exploded fragmentary cross-sectional view taken along and in the general direction of line 2—2 of FIG. 1 showing the hub, bearing structure and retaining cap prior to insertion into the hub.

FIG. 3 is a partially exploded fragmentary cross-sectional view of a hub and retaining cap of another embodiment of the invention.

DESCRIPTION OF THE PREFERRED EMBODIMENTS

A plastic wheel constructed in accordance with the invention is generally depicted by reference numeral 10 in FIG. 1. The wheel comprises a rim 12, a connecting support member 14 and a hub generally designated 16. In the embodiment shown in FIG. 1, the connecting support member is an undulated web as disclosed in U.S. Pat. application Ser. No. 789,154. The hub, as better seen in FIG. 2, has a blind end 18 which is integrally molded with the wheel and acts as a bearing retainer. The opening 20 at the blind end is coaxial with the hub and is of a diameter adapted to allow a shaft or axle (not shown) to fit therethrough and rotate without binding.

At the opposite end of the hub 16, a shallow V-shaped annular groove 22 is provided. The central portion of the groove has a larger diameter than the bore of the hub, thus, permitting a resilient plastic retaining ring 24 to snap into locking engagement with the groove. Thus, the retaining ring can only be removed forcibly. There is no requirement that the ring and groove have a shallow V construction. For example, an arcuate groove and conforming peripheral edge could be used. In selecting the shape of the mating surfaces, it is only necessary that the ring be capable of being snapped into locking engagement with its groove. The internal diameter 28 of the retaining ring 24 is slightly larger than the shaft extending therethrough, thereby allowing free rotation of the shaft.

Even though the aforementioned grooved hub and mating ring is preferred, the retainer can simply be pressed into the hub. In that case, the hub need not be provided with a counterbore or groove and the ring need only have a flat peripheral edge. In order to achieve the press fit, the outer diameter of the ring would be slightly larger than the inner diameter of the hub. Thus, when the ring is forced into the bore, it will lockingly engage the hub and thereby retain the bearing. Of course, a counterbore arrangement can be used if it is so desired.

As indicated above and hereinafter, it is desirable to use a retaining ring which frictionally engages the bore of the hub. However, other means for securing the ring to the hub, by frictional engagement, can be used. For example, the ring can be provided with an axially projecting peripheral wall, the inside surface of which is adapted to frictionally engage the outer surface of the hub; the frictional engagement can be accomplished by an interference fit or by groove means. Tongue and groove types of arrangements can also be envisioned for securing the ring to the hub. Therefore, although the preferred embodiments disclose the ring in frictional engagement with the bore of the hub, it is not intended that this invention be limited thereto. The principal requirements for the ring are that it be made of a resilient material and that its shape permits frictional engagement with the hub.

Although it is preferred to fabricate the wheel with a hub having a blind end, there may be situations in which it is desirable to utilize retaining rings on both ends of the hub and have no blind ends. This is within the scope of the invention.

Referring again to FIG. 2, the roller bearing assembly includes an outer race 26 which tightly engages the bore of the hub and is fixed therein so as not to rotate with respect to the hub. The race 26 is axially located between the inner axial face of the blind end 18 and the inner edge of the groove 22. A separate roller and cage structure 27 fits within the outer race 26 and is adapted to roll upon the inner surface of the outer race and a shaft or axle (not shown) disposed within the hub. The inner diameter of the roller and cage structure, of course, approximates the outer diameter of the shaft to be journaled therein. The roller and cage structure is held in place by the retaining ring 24.

It will be appreciated that it is within the scope of this invention to use rolling elements without a retaining cage. In one such embodiment, a plurality of rollers, each having reduced ends, are retained in the hub by disposing the reduced ends in annular spaces provided in the inner axial faces of the retaining ring and blind end. Thus, the rollers are maintained in position in the bore without the cage structure.

In another embodiment of the invention, seen in FIG. 3, the wheel has a connecting support member comprising a web 30 in combination and integral with axially projecting spokes 32. This construction also provides a wheel capable of carrying heavy loads. It is within the scope of the invention to use wheels having open spokes as connecting support members. The wheel shown in FIG. 3 has a hub 34 with a blind end 36. The blind end is provided with a thin flexible inwardly projecting axial wall 37 which seals to a shaft (not shown) extending through the opening 38. The opening 38 is slightly smaller than the shaft so that the axial wall sealingly engages the shaft but will not bind thereto. The hub has a counterbore 39 with a shallow groove 40 in the bore of the counterbore. The outer race 42 is inserted into the hub 34 and extends from the inner surface of the blind end 36 to about the axial end of the hub. This means that the race extends axially beyond the inner edge of the counterbore. Thus, the counterbore and race create an annular space in the hub and around the race. The roller and cage structure 44, disposed within the hub, engages the outer race and will journal a shaft therein.

The retaining and sealing ring for use with the structure of FIG. 3 is generally designated by the reference numeral 46. The ring is a unitary element and is fabricated of a resilient material so that it can snap into locking engagement with the hub in the same manner as described above with respect to ring 24. The retaining ring 46 comprises a locking sleeve 48 which has a peripheral configuration adapted matingly to engage groove 40. In the embodiment shown in FIG. 3, the groove has a shallow V-shaped form and the peripheral surface of the locking sleeve 48 has a V-shaped projection 49 thereon. The inside diameter of the locking sleeve can be slightly less than the outside diameter of the outer race 42 so that there can be an interference fit between the outer race and the locking sleeve. Alternatively, the ring 46 can lockingly engage the hub by an interference fit in which case the outside diameter of the locking sleeve is larger than the inside diameter of the counterbore; and in that case, the locking sleeve is not provided with a peripheral projection and the counterbore is not provided with a groove.

The axial dimension of the locking sleeve is adapted to conform with the axial dimension of the annulus formed by the counterbore and outer race. When the retaining ring is in locked engagement with the hub, the ring shoulder 50 abuts the hub shoulder 52. The inner axial face 54 of the retaining ring abuts the axial end of the outer race 42 and locks the roller and cage structure within the hub. In this embodiment, the sealing function of the retaining ring is effected by the bore of the retaining ring. The retaining ring is formed with a thin axial wall such as to provide a thin cylindrical lip 56 on the end of the bore. This lip is flexible and seals against the shaft without fracturing. The retaining ring is molded of a resilient material so as to engage the shaft extending therethrough and lock with the hub. A large protective shoulder 58 is provided radially outward of the axial wall to protect the same. The ring 46 is easily molded of resilient plastic material by well-known molding techniques to provide the desired configuration.

The outer race 26 of FIG. 2 and the race 42 of FIG. 3 are fabricated of steel by any known technique. Preferably, these races are rolled from sheet metal, their abutting edges being askew relative to the axis of the cylinders formed. Axial joints produce "thumping" during bearing rotation and cause excessive wear and early failure. The form of nonaxial joint shown in the drawing is not intended to be limited.

The wheels of the invention are fabricated by injection molding the wheel and hub, and while the hub is still soft prior to cooling, the split outer race is placed into the bore of the hub. The diameter of the split race is somewhat larger than its final dimension. As the hub cools down, the inside diameter thereof contracts and thereby exerts an inward radial force on the outer race, thereby securing the race within the hub. The bearing assembly is then slipped into the hub and the retaining ring is set into place to complete the assembly.

What is desired to be secure by Letters Patent of the United States is:

1. A vehicle wheel mountable to a cylindrical shaft and comprising a rim, a hub, connecting support structure joining the rim to the hub, the hub having a cylindrical bore for receiving the cylindrical shaft therethrough, resilient annular sealing means at opposite ends of the bore, said sealing means having a central passageway to accommodate the shaft in frictional engagement therewith, said sealing means comprising at least one annular ringlike sealing element disposed at one end of the bore, said element carrying said central passageway, and formations of conforming configuration on the outer circumferential surface of said element and the inner circumferential surface of the hub at the said bore end, said formations establishing a locked frictional engagement between said element and hub sealing off the interior of the hub except for the shaft, said sealing element being disposed at one end of the hub and said sealing means further including said hub having a blind end at the other end of the bore, said blind end being defined by an end wall integral with said hub and carrying the said central passageway.

2. The vehicle wheel as claimed in claim 1 in which the end wall has an axial wall extending inwardly into said bore for frictional engagement sealingly with the shaft.

3. The vehicle wheel as claimed in claim 1 in which said sealing means at opposite ends of the hub have an axial wall engageable sealingly with the shaft.

4. The vehicle wheel as claimed in claim 1 in which said sealing element is formed as an end cap carrying the central passageway and having an annular cylindrical wall, the annular wall carrying one of said formations and a shoulder adjacent said annular wall and in abutting relation with said hub when the element is engaged therewith.

5. The vehicle wheel as claimed in claim 1 in which said sealing element is an end cap carrying the central passageway and having an annular cylindrical wall, the annular wall carrying one of said formations and a shoulder adjacent said annular wall and in abutting engagement with the hub.

6. The vehicle wheel as claimed in claim 1 in which there is a bearing assembly disposed said the hub,
,said sealing element being formed as a resilient annular bearing retainer frictionally engaging the hub and locking the bearing assembly within the hub, said retainer having a central passageway and a wall portion engageable frictionally with the shaft, and the hub has a counterbore therein, an annulus defined between the counterbore and the bearing assembly, and the retaining means has an axial locking sleeve extending into the counterbore and adapted to frictionally secure the retaining means in the hub and an inner axial face which abuts the axial end of the bearing assembly.

7. The vehicle wheel as claimed in claim 1 in which there is an antifriction bearing assembly disposed within said hub between the opposite ends thereof, said bearing assembly including an outer race independently secured within the bore and a plurality of rolling elements journaled within the outer race and adapted to have the shaft journaled therein, said sealing means serving to retain said assembly within the hub.

8. The vehicle wheel as claimed in claim 7 in which said outer race comprises a split cylindrical member having diagonally extending abutting edges across the entire width of the said member.

9. The vehicle wheel as claimed in claim 7 in which said sealing means engage the axial edges of said race at opposite ends thereof.

10. The vehicle wheel as claimed in claim 7 in which one of the axial edges of said outer race abuts the blind end and the other opposite end thereof engages said sealing element.

11. A vehicle wheel mountable to a cylindrical shaft and comprising a rim, a hub, connecting support structure joining the rim to the hub, the hub having a cylindrical bore for receiving the cylindrical shaft therethrough, resilient annular sealing means at opposite ends of the bore, bearing means between said sealing means, said sealing means having a central passageway to accommodate the shaft in frictional engagement therewith, said sealing means comprising a unitary annular ringlike sealing element disposed at one end of the bore, said element carrying said passageway and formations of interlocking configuration on the outer circumferential surface of said element and the inner circumferential surface of the hub at the bore end, said formations establishing a locked engagement between the element and hub sealing off the interior of the hub except for the shaft, said sealing means at opposite ends of the hub together defining said opposite ends as a part thereof after assembly whereby the sealing means becomes a functionally integral part of the wheel and retains said bearing means.

12. A vehicle wheel as claimed in claim 11 in which said formations comprise an annular groove on one of said inner and outer circumferential surfaces and an annular tongue on the other of said inner and outer circumferential surfaces.

13. A vehicle wheel as claimed in claim 11 in which said element has an outer diameter greater than the inner diameter of the bore of the hub at the end thereof and said element is engaged within the hub in an interference fit.

14. A vehicle wheel as claimed in claim 11 in which said element is engageable in nonbinding relationship with said shaft.

15. The vehicle wheel as claimed in claim 11 in which said sealing means further includes said hub having an integral end wall defining a blind end at the other end of the hub, said end wall carrying the said central passageway, said sealing means defining the end walls of the hub subsequent to assembly.

16. The vehicle wheel as claimed in claim 15 in which said sealing means includes cylindrical wall formations resiliently and frictionally engageable with said shaft when the wheel is engaged therewith.

* * * * *

UNITED STATES PATENT OFFICE
CERTIFICATE OF CORRECTION

Patent No. 3,640,584          Dated  February 8, 1972

Inventor(s)  MILTON SOLOMON

It is certified that error appears in the above-identified patent and that said Letters Patent are hereby corrected as shown below:

Column 4, line 73, change "said" to --within--.

Signed and sealed this 27th day of June 1972.

(SEAL)
Attest:

EDWARD M. FLETCHER, JR.          ROBERT GOTTSCHALK
Attesting Officer                Commissioner of Patents